United States Patent [19]

Pape

[11] 4,223,922
[45] Sep. 23, 1980

[54] FLEXIBLE PIPE CONNECTION

[75] Inventor: Karl Pape, Wolfsburg, Fed. Rep. of Germany

[73] Assignee: Volkswagenwerk Aktiengesellschaft, Fed. Rep. of Germany

[21] Appl. No.: 14,342

[22] Filed: Feb. 23, 1979

[30] Foreign Application Priority Data

Mar. 11, 1978 [DE] Fed. Rep. of Germany ....... 2810584

[51] Int. Cl.$^2$ ........................................... F16L 35/00
[52] U.S. Cl. ..................................... 285/39; 285/231; 285/261; 285/364
[58] Field of Search ................. 285/420, 39, 421, 364, 285/406, 231, 261; 403/338, 397; 24/255 R, 259 R

[56] References Cited

U.S. PATENT DOCUMENTS

| 1,128,080 | 2/1915 | Van Meter | 285/420 X |
| 2,126,505 | 8/1938 | Risser | 285/420 X |
| 3,521,911 | 7/1970 | Hanes et al. | 285/321 X |

FOREIGN PATENT DOCUMENTS

| 2623520 | 12/1977 | Fed. Rep. of Germany | 285/406 |
| 2130789 | 10/1972 | France | 285/261 |
| 603933 | 6/1940 | United Kingdom | 285/167 |

Primary Examiner—Dave W. Arola
Attorney, Agent, or Firm—Brumbaugh, Graves, Donohue & Raymond

[57] ABSTRACT

A pipe connection, particularly useful for a motor vehicle exhaust line, is provided with a spherical sealing surface on one pipe which projects into an axial accommodating space on a mating pipe. The pipes are held together by spring clamps which have opposite ends facing each other for engaging oppositely facing recesses on clamping structures (e.g., flanges) associated with each pipe. The spring clamps are constructed as C-shaped leaf springs having rounded ends.

2 Claims, 3 Drawing Figures

FLEXIBLE PIPE CONNECTION

BACKGROUND OF THE INVENTION

This invention relates to pipe connections, and particularly to flexible connections for use with rigid exhaust pipes in a motor vehicle. The commonly owned U.S. patent application Ser. No. 800,851 filed May 26, 1977, now U.S. Pat. No. 4,181,332, by Joachim Neumann discloses a releasable, flexible, sealed connection between two pipes, such as the exhaust pipes of a motor vehicle. This pipe connection is provided with a spherical sealing surface on one pipe which projects into an axial accommodating space on the mating pipe. The pipes are held together by spring clamps which have ends facing each other for engaging oppositely facing recesses on clamping structures (e.g., flanges) associated with each pipe.

The spring clamps disclosed as an exemplary embodiment in the aforementioned patent application consist of round stock in the shape of a "C" with at least one loop opposite the gap in the coupling between the facing ends. It has been found that under certain conditions such spring clamps present difficulties in achieving a stable equilibrium position in the installed condition. In addition, it is difficult to employ a simple tool for spreading such spring clamps during assembly or disassembly.

SUMMARY OF THE INVENTION

An object of the present invention is to provide a pipe connection of the type described above which ensures a stable equilibrium position of the spring clamps when assembled, without requiring additional expense.

A further object of the present invention is to provide spring clamps for the aforementioned pipe connection which are of simple construction, are easy to assemble and disassemble, and which avoid frictional noise during operation.

These objects, as well as further objects which will become apparent in the discussion that follows, are achieved, according to the present invention by forming the spring clamps as C-shaped leaf springs with rounded ends. Advantageously, the leaf springs are provided near their ends with holes that may be engaged by a spreading tool.

The present invention therefore deliberately avoids the use of round stock to make the spring clamps and adopts flat stock so that the spring clamps become C-shaped leaf springs. By rounding their ends, in conjunction with the stiffness of the clamps transverse to the plane of the "C", and because of the flat stock, the desired stable equilibrium position in the installed condition is achieved at no additional expense. Since the leaf springs are not looped like the spring clamps described as an embodiment in the aforementioned U.S. application, production of these clamps is very simple.

For a better understanding of the invention, together with other and further objects, reference is made to the following description, taken in conjunction with the accompanying drawings.

DESCRIPTION OF THE PREFERRED EMBODIMENT

Figure 1:
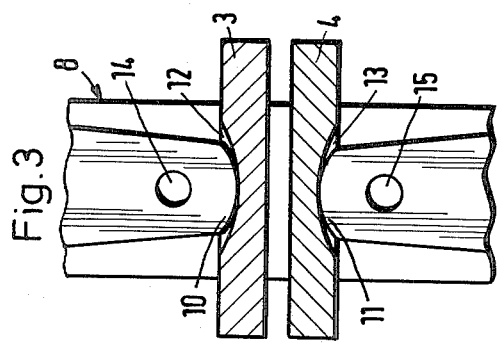
FIG. 1 is a longitudinal sectional view of the entire pipe connection arrangement, including the C-shaped leaf springs employed as spring clamps.

Referring first to FIG. 1, the two exhaust pipes 1 and 2 to be connected have flanges 3 and 4, partially enclosing each other, movable relative to each other, and sealed coaxially by convex sealing surfaces 6 and 7 on extensions pointing essentially in the axial direction of the exhaust line. Secure contact of the sealing surfaces 6 and 7 with each other is achieved in this embodiment by two substantially C-shaped leaf springs 8 and 9 acting as spring clamps. The ends of these spring clamps point towards each other, as indicated only on the spring clamp 8 and 10 and 11, and engage depressions or recesses 12 and 13 in flanges 3 and 4, so that they hold the sealing surfaces tightly together even in case of relative movement between the pipes 1 and 2. To facilitate assembly—i.e. for insertion of a spreading tool—the leaf springs 8 and 9 are provided with holes near their ends, as indicated at 14 and 15 on leaf spring 8.

Figure 2:
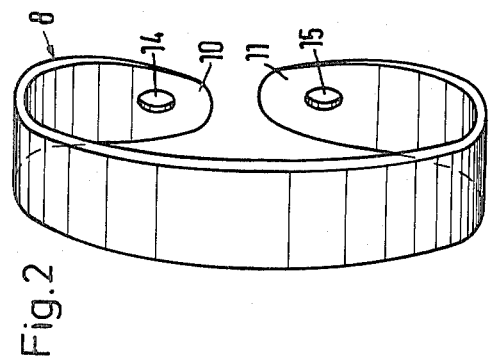
FIG. 2 is a perspective view of one of the leaf springs shown in FIG. 1.
Figure 3:
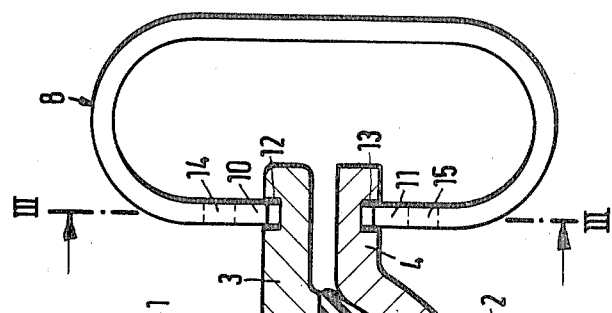
FIG. 3 is a cross-sectional view of the pipe connection of FIG. 1, taken along the line III—III.

As may be seen clearly in FIG. 2, the ends 10 and 11 are rounded, and as shown in FIG. 3 the recesses 12 and 13 are rounded also, though with longer radii of curvature, producing a self-centering effect of the leaf springs when assembled. This construction suppresses undesirable noises due to friction during relative movement between the flanges 3 and 4.

While there has been described what is believed to be the preferred embodiment of the invention, those skilled in the art will recognize that various changes and modifications may be made thereto without departing from the spirit of the invention, and it is intended to claim all such embodiments as fall within the true scope of the invention.

I claim:

1. In apparatus for providing a releasable, flexible sealed connection between first and second pipes, said apparatus comprising: a spherical sealing surface projecting axially outwardly from an end of said first pipe, an axial accommodating space on an end of said second pipe for receiving said spherical surface, first and second clamping structures rigidly attached to said first and second pipes, respectively, and at least one spring clamp having opposite ends directed toward each other and bottomed in oppositely facing recesses on said first and second clamping structures to urge said spherical surface into said accommodating space, said recesses having an arcuate cross section and said spherical surface and said accommodating space cooperating to allow said pipes to swivel with respect to each other;

the improvement wherein said at least one spring clamp is a flat C-shaped nonoverlapping spring, said spring formed with a width substantially greater than its thickness and with rounded ends forming an arc which lay in the plane of said width of said spring, said arc having radii of curvative less than the radii of curvature of said curved paths of said recesses.

2. The apparatus recited in claim 1, wherein said at least one spring clamp is provided near its ends with holes to be engaged by a spreading tool.

* * * * *